(12) United States Patent
Häger

(10) Patent No.: US 12,535,017 B2
(45) Date of Patent: Jan. 27, 2026

(54) METHOD AND IMPROVED DEVICE FOR CONVERTING THERMAL ENERGY INTO KINETIC ENERGY

(71) Applicant: Jasper Häger, Mönchhagen (DE)

(72) Inventor: Jasper Häger, Mönchhagen (DE)

( * ) Notice: Subject to any disclaimer, the term of this patent is extended or adjusted under 35 U.S.C. 154(b) by 0 days.

(21) Appl. No.: 18/837,179

(22) PCT Filed: Feb. 3, 2023

(86) PCT No.: PCT/EP2023/052631
§ 371 (c)(1),
(2) Date: Aug. 8, 2024

(87) PCT Pub. No.: WO2023/152032
PCT Pub. Date: Aug. 17, 2023

(65) Prior Publication Data
US 2025/0163832 A1    May 22, 2025

(30) Foreign Application Priority Data
Feb. 11, 2022  (DE) .......................... 102022103298.1

(51) Int. Cl.
| | |
|---|---|
| *F01K 9/00* | (2006.01) |
| *F01K 13/00* | (2006.01) |
| *F01K 17/00* | (2006.01) |
| *F01K 17/02* | (2006.01) |

(52) U.S. Cl.
CPC .............. *F01K 9/003* (2013.01); *F01K 13/00* (2013.01); *F01K 17/005* (2013.01); *F01K 17/02* (2013.01)

(58) Field of Classification Search
CPC ........ F01K 9/003; F01K 13/00; F01K 17/005; F01K 17/02
See application file for complete search history.

(56) References Cited

U.S. PATENT DOCUMENTS

| | | | | |
|---|---|---|---|---|
| 8,707,701 | B2 * | 4/2014 | Burkhart | F01K 27/02 60/641.2 |
| 8,850,814 | B2 * | 10/2014 | Kaplan | F01K 23/04 60/671 |
| 8,904,791 | B2 * | 12/2014 | Lehar | F01K 25/103 60/671 |
| 2011/0036091 | A1 * | 2/2011 | Waterstripe | F01K 13/02 60/641.2 |
| 2020/0277881 | A1 * | 9/2020 | Zettner | F01K 23/02 |
| 2021/0156597 | A1 * | 5/2021 | Bandhauer | F25B 6/04 |

FOREIGN PATENT DOCUMENTS

JP    02188605 A  *  7/1990

* cited by examiner

*Primary Examiner* — Hoang M Nguyen
(74) *Attorney, Agent, or Firm* — Isidore PLLC

(57) ABSTRACT

The invention relates to a method for converting thermal energy, in particular energy from the environment, into kinetic energy and to a device for converting thermal energy into kinetic energy, said device being used to carry out the method. In the method according to the invention, two circuits with fluids are operatively connected together in that on at least three heat exchangers, one fluid influences the others. The two circuits are additionally provided with environmental heat exchangers which preset the temperature of the fluids being used. The exhaust heat used for this purpose can originate from the industrial sector for example.

11 Claims, 1 Drawing Sheet

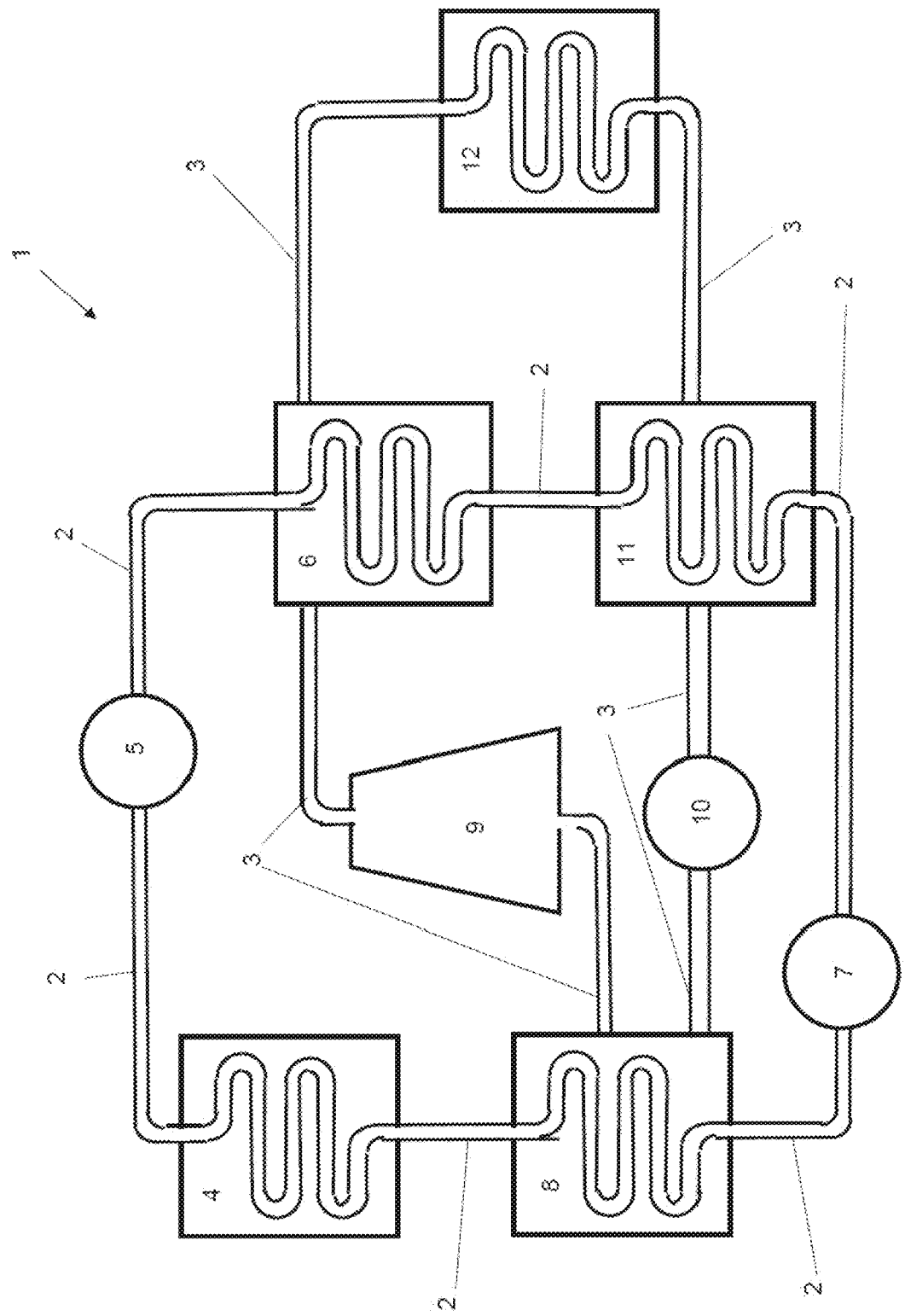

METHOD AND IMPROVED DEVICE FOR CONVERTING THERMAL ENERGY INTO KINETIC ENERGY

The present invention relates to a method of converting thermal energy, especially energy from the environment, to kinetic energy, and to an apparatus for converting thermal energy to kinetic energy with which the method can be executed.

PRIOR ART

Supplying the population with energy is a topic of central importance. In particular, the generation of "clean" energy is a political goal in order to protect the environment and to slow or even to stop climate change. Known environmentally friendly energy generation facilities are hydroelectric plants, solar collectors, which are also utilized industrially in solar parks, and wind turbines, which convert wind into energy on land and increasingly also in large offshore facilities. In the long term, these technologies will be insufficient to stop climate change. In addition, the consumption of power is rising continuously as a result of electromobility.

Document DE 10 2019 006 184 A1 therefore presents an apparatus for conversion of thermal energy to kinetic energy by combined utilization of a heat pump with a thermal power plant. This apparatus is based on two thermodynamic circulation processes. The two circular processes are connected to one another in the machine by two heat exchangers for the purpose of heat transfer. This utilizes the ability of heat pumps to absorb thermal energy with gases at heat exchangers and to achieve, by means of temperatures with compression, high simultaneously rising gas pressure and reduction in volume. The amount of energy to operate the pump is much smaller than the amount of energy pumped. The heated fluid is then utilized to evaporate a second fluid, such that the gas pressure can be converted to kinetic energy in a thermal engine. Since the fluid has to be condensed as in any conventional power plant, the unutilized residual steam is directed into the condenser, which is cooled by the very cold fluid from the heat pump cycle that has been decompressed by means of an expansion valve. The fluid from the thermal engine cycle condenses therein and is pumped back into the heat exchanger for repeated evaporation. The fluid from the heat pump is then heated once again in the heat exchanger and can be drawn back into the compressor with the thermal energy therein from the condenser and the environment, in order likewise to go back into the heat exchanger, where the heat is transferred to the fluid from the thermal engine circuit. As a result, constant conversion of thermal energy to kinetic energy is achievable. Since heat pumps can be used for cooling and heating alike, the energy conversion machine uses both potentials in order to make fluids having boiling points below 273 degrees kelvin utilizable. Since the condenser used can reach temperatures below 250 degrees kelvin, temperature differences of 100 degrees kelvin or more are possible. Fluids such as isobutane, for example, can thus build up high pressure, which is utilized in thermal engines for conversion to kinetic energy until the gas flows to the condenser at minimum pressure and very low temperature. When ammonia is used, for example, the condenser can reach temperatures below 250 degrees kelvin and cause gases such as isobutane, for example, to condense. As a result, the temperature gradient and hence the pressure differential in the thermal engine is sufficient to convert the predominant portion of the energy that has been absorbed in the heat exchanger to kinetic energy. Condensation turbines, as a specific type of thermal engine, can additionally further increase efficiency by utilizing the enthalpy of evaporation. In experiments conducted for this development, the developer recognized that efficiencies are still insufficient for effective use in industrial dimensions.

It is an object of the invention to provide an extended method and an improved apparatus for conversion of thermal energy to kinetic energy.

The object is achieved by the features of method claim 1 and of apparatus claim 3, and the respective dependent claims describe further configurations.

Definitions

An environmental heat exchanger in the context of the invention is an apparatus in which energy is tapped from the environment in the form of heat, for example the waste heat from industrial processes, thermal energy from power plants intended for the apparatus, from water or water vapor, or ultimately directly from the environment, provided that this thermal energy source is sufficient to provide the required level within the apparatus.

If a fluid is being heated, evaporation of a portion of the fluid is also simultaneously possible, without any need to describe this in detail.

If a fluid is releasing heat, liquefaction is simultaneously also possible, without a need to describe this in detail.

SUMMARY OF THE INVENTION

First of all, some fundamentals for the understanding of the method and apparatus shall be set out. The starting point in the case of heat pumps is generally efficiencies only, and not figures of merit. In principle, the power consumption of a pump, the pump stroke and the amount of water pumped are used to calculate the work performed and hence the efficiency of the pump. By contrast, the water temperature and hence the pumped heat capacity are immaterial. In the case of a suitable arrangement, i.e. a high difference between the ambient temperature and the temperature of the pumped medium, such enormous amounts of heat, large amounts of energy carriers, can be transported with the same pump output. The aim is to make this heat utilizable. The figure of merit of a heat pump—unlike its efficiency—therefore makes it clear what amount of energy is present in the pumped fluid.

In the case of a conventional cooling system, the figure of merit is 3 to 4 times the energy expended in its compressor. In the case of a pump output of 1 kW, it would therefore be possible to expect a cooling output of up to 4 kW. The cooling generated is utilized, for example, in a refrigerator in order to draw the heat out of foods as thermal energy source and hence to extend the storage life of the foods.

Since a heat pump follows the first principle of thermodynamics, the amount of energy corresponding to the cooling output should be removed as heat. The heat released therefore corresponds to the magnitude of the cooling output required, which is used to lower the temperature within the refrigerator to the level of the required cooling. The heat released into the surrounding space, in the case of a refrigerator, is dissipated according to the prior art without further utilization. In the case of a cooling output of 4 kW per 1 kW of pump output, the amount of heat to be removed on the outside of the refrigerator is thus likewise 4 kW from the interior, and additionally 1 kW of waste heat from the compressor.

A thermal engine in the form of an ORC steam turbine converts temperature differentials, by means of expansion of gases, to rotational energy to a high degree-usually in the region of 70% or more; the remainder is released to a condenser as heat in the partly condensed fluid. For the apparatus to work, a hot side and a cold side are required in the thermal engine. If the cooling body of a heat pump takes the form of a condenser and the hot side of the heat pump takes the form of an evaporator, given suitable choice of fluid and the absorption of heat from the environment, the constituents of the heat pump are configured with respect to the hot side or cold side of the thermal engine such that rotational energy is converted to electrical energy to a high degree. The magnitude of the energy of the heat released by the thermal engine is sufficiently high that it distinctly exceeds the pump energy required or energy for the compressor.

In order to increase the figures of merit, extensions of the circuits of the heat pump and of the thermal engine by a suitable number of further heat exchangers are advisable, since, as explained above, output increases with the magnitude of the temperature differential.

Against this background, the method of the invention for conversion of thermal energy to kinetic energy is presented. In this method, the recurrent method steps proceed in parallel in a first circuit and a second circuit, where the circuits are subject to mutual conditionality in that one condenser in one circuit is an evaporator in the other circuit and vice versa. The fluid in a circuit, as it moves through the circuit, in relation to its temperature, is constantly influenced by the fluid in the other circuit.

In a first circuit, an initially gaseous first fluid is compressed, resulting in an increase in temperature. The compression generates a pumping movement of the fluid through the circuit. This first fluid is cooled in a first heat exchanger with condensation; the first fluid is cooled further in a third heat exchanger, likewise with condensation and decompression of the first fluid in a decompression valve. Thereafter, it passes through a second heat exchanger and absorbs heat, before absorbing further thermal energy in an environmental heat exchanger, before being fed back to the above-described compression.

A second fluid is pumped through the second circuit and heated in a third heat exchanger, while the first fluid is cooled as described above. There is evaporation in a second environmental heat exchanger and further heating in a first heat exchanger. This further heating is accompanied by the first cooling of the first fluid. From the first heat exchanger, the second fluid enters a thermal engine, with a resultant reduction in pressure and a release of thermal energy. In the thermal engine, the resultant rotational energy can be abstracted and converted, for example, to electrical energy. Expansion by means of the thermal engine is followed by recycling into the second heat exchanger and liquefaction, before the sequence begins again with the pumping operation in the direction of the third heat exchanger.

The result of this method with two overlapping and mutually influencing circuits is the attainment of optimal overall state of the respective fluid, especially of the second fluid, since this is to be introduced into the thermal engine at maximum temperature and released again back into the circuit at minimum temperature. If the temperature difference between thermal engine inlet and thermal engine outlet is particularly high, high kinetic energy is generatable.

The compression of the initially gaseous first fluid results in attainment of a temperature level where heat is transferred to the second fluid in the first heat exchanger, such that it attains the desired inlet temperature in the thermal engine. The first fluid flows onward in cooled form and is cooled again in a third heat exchanger, where the heat is transferred to the second fluid. This condenses it, and it is expanded by means of the decompression valve. As a result, it is ready to absorb heat again, firstly in a second heat exchanger and later in the environmental heat exchanger.

In order to be able to optimally conduct such a method, preference is given to using fluids that work effectively under the prevailing climatic conditions and the resulting temperature differences from the heat sources. Propane, carbon dioxide and ammonia may be cited here as examples, but other fluids are not ruled out. Among those mentioned, propane is of very good suitability since it is quite easily controllable and thus enables greater safety in utilization. Moreover, it is not converted to TFA and hence is not persistent if it gets into the environment.

In a particular configuration of the method of the invention for conversion of thermal energy to kinetic energy, there is no further condensation in the third heat exchanger. For optimal progression of the method, this should then already be complete in the first heat exchanger. In the optimal case, the first fluid is at environmental temperature at the outlet from the first heat exchanger. This increases the effectiveness of the method.

In a further configuration of the method of the invention for conversion of thermal energy to kinetic energy, the second fluid is already fully evaporated in the second environmental heat exchanger. This method improvement also leads to an increase in efficiency.

Furthermore, in a particular configuration of the method of conversion of thermal energy to kinetic energy, temperature and/or flow rate and/or pressure measurements are undertaken at at least one point in each circuit. This serves firstly for better monitorability of the method process; secondly, regularly sampled data can give information about the process and warn the users if necessary. For instance, these measurements have the purpose of increasing efficiency, but also for safety reasons. Moreover, this enables control by valves, which allow optimization of energy flow and heat transfer and enable safety options. For example, excessively high or excessively low heat inputs can be altered before the system overheats or overcools, or the thermal engine is overloaded or underloaded.

Finally, a further configuration of the method of the invention for conversion of thermal energy to kinetic energy includes the feature that waste heat generated at the pump in the second circuit is fed back to the circuit to the second circuit between the second environmental exchanger and the first heat exchanger or between the first heat exchanger and the thermal engine. Thus, even waste heat formed in the process can be sent to a further use, which serves to increase efficiency. In an equivalent manner, it is also possible to abstract heat from other heat-releasing constituents in the circuit and feed them back into the circuit at a suitable point.

The improved apparatus for conversion of thermal energy to kinetic energy for use in the method described comprises two circuits for fluids, where a first circuit comprises, in this sequence, a first environmental heat exchanger, a compressor, a first heat exchanger, a decompression valve and a second heat exchanger. In the first circuit, the first heat exchanger serves as condenser, the second heat exchanger as evaporator. A second circuit comprises, in this sequence, the first heat exchanger, a thermal engine, the second heat exchanger and a pump, where, in the second circuit, the first heat exchanger serves as evaporator and the second heat exchanger as condenser. The two circuits are fluidically unconnected to one another, but have functional relationships in the first and second heat exchangers.

According to the invention, a third heat exchanger is disposed downstream of the first heat exchanger in the first circuit, and the third heat exchanger and a second environmental heat exchanger are disposed downstream of the pump in the second circuit. The circuits in the third heat exchanger likewise have a functional relationship between the first and second circuits. The additional incorporation of a third heat exchanger and a second environmental heat exchanger further increases the effectiveness of the apparatus compared to the apparatus described in the prior art. The fluids can be adjusted even more accurately to the required temperatures and overall states in the circuit, such that an optimal result is achievable in the thermal engine.

In a particular configuration of the improved apparatus for conversion of thermal energy to kinetic energy, the apparatus has measurement sensors for temperature and/or flow rate and/or pressure and a control unit for processing of measurement data. For certainty, however, especially for attainment of optimal efficiencies, it is indispensable that measurement data such as pressure, temperature, flow rate or the like are detected and evaluated, and requisite adjustments such as increasing the pressure in the fluid, altering the feed of heat from the environment, etc. are implemented. Constant monitoring of indices is also required for uniform effectiveness of the thermal engine.

According to a particular configuration of the improved apparatus of the invention for conversion of thermal energy to kinetic energy, the environmental heat exchangers are incorporated into circuits. The environmental heat exchanger is effectively converted to a conventional heat exchanger in which thermal energy generated elsewhere is abstracted and transferred to the fluid. This serves to extend the possible uses and for adjustment of the apparatus to the circumstances at the site of use.

In a particular configuration of the improved apparatus for conversion of thermal energy to kinetic energy, the pump in the second circuit is configured as a compressor. This additional function of the pump increases the influence on the fluid, since it can be even more accurately matched to the required specifications for high effectiveness of the thermal engine.

Finally, in a particular configuration of the improved apparatus for conversion of thermal energy to kinetic energy, the first heat exchanger and the third heat exchanger and/or the second environmental heat exchanger are connected in a heat exchange arrangement. Thus, the apparatus can be made much more compact without losing effectiveness. Use in smaller scopes is thus possible. Furthermore, it is of f course possible that other components can also be combined in more compact units, separately or collectively with the components mentioned, if this is possible, for example, for reasons of better energy exploitation in the system.

In a last configuration of the improved apparatus of the invention for conversion of thermal energy to kinetic energy, the two circuits are provided with bypass conduits in the region of the environmental heat exchangers. In this way, the system, when the fluids are being diverted through the bypass conduits, can be protected in a controlled manner from the absorption of further energy in the environmental heat exchangers and hence cooled. These bypass conduits then also provide protection from overheating of the system, such that damage or accidents can be avoided.

The great advantage of the apparatus is that the first and second environmental heat exchangers can transfer waste heat of any kind, for example from laundries, energy generation, refuse incineration, landfill degassing and other industrial processes, and natural waste heat, for example from hot sources, into the apparatus. This does not necessarily have to be effected directly, but can also be achieved via an upstream heat circuit. This enables very flexible usability at many different sites, preferably where waste heat of any kind would otherwise be lost unutilized.

There are many different possible fluids. Because of good utilizability under the conditions that prevail on Earth, carbon dioxide, ammonia and in particular propane are preferred. These substances are comparatively easy to obtain and to handle. It is possible to use different fluids for the circuits if this does not affect the effectiveness of the apparatus.

For all measurement and monitoring devices and the control device, an energy supply should be provided. Pumps must also be operated electrically. In addition, energy is introduced into the system in the environmental heat exchangers where waste heat, for example, can be absorbed, for example, from industry.

The details are summarized hereinafter in another logical set up in order to show the functional relationships of the invention and the resulting results up to energy conversion in modified form.

The method of converting thermal energy to kinetic energy comprises recurrent method steps in a first circuit. These include the absorption of thermal energy from the environment or from external processes by means of evaporation of a first fluid in a first environmental heat exchanger, and the compression of the gaseous first fluid with accompanying increasing temperature by a compressor, where the compression generates a pumping movement of the fluid through the first circuit. In addition, in this circuit, there is release of thermal energy from the first fluid in a first heat exchanger with accompanying condensation and further release of thermal energy from the first fluid in a third heat exchanger with accompanying further condensation. This is followed by decompression of the first fluid through a decompression valve and again by absorption of thermal energy and evaporation of the first fluid in a second heat exchanger.

At the same time, there are recurrent method steps in a second circuit. These include the release of thermal energy with accompanying condensation of a second fluid in the second heat exchanger, pumping of the second fluid by means of a pump through the second circuit, and absorption of thermal energy with accompanying evaporation of the second fluid in the third heat exchanger, with generation of an increase in vapor pressure in the second circuit. Subsequently, there is further absorption of thermal energy from the environment or from external processes with accompanying further evaporation of the second fluid in a second environmental heat exchanger, with achievement of a further increase in vapor pressure in the second circuit, and further absorption of thermal energy with accompanying further evaporation of the second fluid in the first heat exchanger, with achievement of a further increase in vapor pressure in the second circuit. Thereafter, the second fluid which is then in gaseous form is directed into a thermal engine in which vapor pressure and thermal energy are converted to kinetic energy, combined with abstraction of kinetic energy in the thermal engine, with a decrease of vapor pressure and thermal energy.

The two circuits are subject to mutual conditionality in that one condenser in the first circuit is an evaporator in the other circuit and vice versa.

BRIEF DESCRIPTION OF THE DRAWING

FIG. 1 shows a schematic overview of the apparatus of the invention.

EXECUTION OF THE INVENTION

The invention is elucidated by a working example. In this regard, FIG. 1 shows a schematic overview of the apparatus of the invention.

Two circuits 2, 3 are shown, which are in contact at multiple points. Wherever there is contact of circuits 2, 3 there is a heat exchanger 6, 8, 11 disposed. The fluids that move through the circuits 2, 3 mutually influence one another here. A compressor 5 is sufficient to achieve a flowing motion in the first circuit. The fluid from the first circuit 2 is compressed here, and its temperature is increased. There is a release of thermal energy in the first heat exchanger 6, a further release of thermal energy in the third heat exchanger 11, and decompression in the decompression valve 7.

Thereafter, fluid absorbs thermal energy first in the second heat exchanger 8 and then in the first environmental heat exchanger 4. The fluid is therefore at its highest temperature after the compression, and at its lowest after the decompression.

In the second circuit 3, a fluid is pumped by a pump in the direction of the third heat exchanger 11, where the fluid is heated. There is further heating of the fluid in the second environmental heat exchanger 12, another increase in temperature in the first heat exchanger 6, and then transfer to the thermal engine 9. The heat generates kinetic energy, which cools the fluid. The fluid is then liquefied again in the second heat exchanger 8 before being pumped back into the second circuit 3.

LIST OF REFERENCE NUMERALS

1 apparatus
2 first circuit
3 second circuit
4 first environmental heat exchanger
5 compressor
6 first heat exchanger
7 decompression valve
8 second heat exchanger
9 thermal engine
10 pump
11 third heat exchanger
12 second environmental heat exchanger

The invention claimed is:

1. A method of converting thermal energy to kinetic energy, the method comprising:
  in a first circuit (2):
    compressing a first gaseous fluid with an accompanying increase in temperature, wherein the compressing generates a pumping movement of the fluid through the first circuit (2);
    cooling the first fluid in a first heat exchanger (6) with at least partial condensation;
    further cooling the first fluid in a third heat exchanger (11);
    decompressing the first fluid in a decompression valve (7);
    absorbing heat in a second heat exchanger (8); and
    further absorbing thermal energy in a first environmental heat exchanger (4); and
  parallelly in a second circuit (3):
    pumping a second fluid through the second circuit (3);
    heating the second fluid in the third heat exchanger (11);
    at least partially evaporating the second fluid in a second environmental heat exchanger (12);
    further heating the second fluid in the first heat exchanger (6);
    transferring the second fluid to a thermal engine (9) with associated pressure reduction and release of thermal energy;
    abstracting the energy in the thermal engine (9); and
    recycling the second fluid into the second heat exchanger (8) and liquefying the second fluid;
  wherein the first and second circuits (2, 3) are subject to mutual conditionality in that a condenser in one circuit is an evaporator in the other circuit.

2. The method of converting thermal energy to kinetic energy as claimed in claim 1, characterized in that the first working fluid is completely condensed in the first heat exchanger (6).

3. The method of converting thermal energy to kinetic energy as claimed in claim 1, characterized in that the second fluid is completely evaporated in the second environmental heat exchanger (12).

4. The method of converting thermal energy to kinetic energy as claimed in claim 1, characterized in that, at at least one point in each circuit (2, 3), the method comprises:
  taking one or more of temperature, flow rate, and pressure measurements;
  evaluating data collected; and
  optimizing a respective circuit by means of closed-loop controllers.

5. The method of converting thermal energy to kinetic energy as claimed in claim 1, characterized in that waste heat generated at a pump (10) in the second circuit (3) is fed to the second circuit (3) between the second environmental heat exchanger (12) and the first heat exchanger (6) or between the first heat exchanger (6) and the thermal engine (9).

6. An improved apparatus (1) for conversion of thermal energy to kinetic energy, the apparatus comprising:
  a first circuit (2) for fluids comprising: a first environmental heat exchanger (4), a compressor (5), a first heat exchanger (6), a decompression valve (7) and a second heat exchanger (8), wherein, in the first circuit (2), the first heat exchanger (6) serves as condenser and the second heat exchanger (8) serves as evaporator; and
  a second circuit (3) for fluids comprising: the first heat exchanger (6), a thermal engine (9), the second heat exchanger (8) and a pump (10), wherein, in the second circuit (3), the first heat exchanger (6) serves as evaporator and the second heat exchanger (8) serves as condenser;
  wherein the first and the second circuits (2, 3) are fluidically unconnected but have functional relationships in the first heat exchanger (6) and in the second heat exchanger (8), characterized in that, in the first circuit (2), a third heat exchanger (11) is disposed downstream of the first heat exchanger (6), and, in the second circuit (3), the third heat exchanger (11) and a second environmental heat exchanger (12) are disposed downstream of the pump (10), wherein, in the third heat exchanger (11), a functional relationship exists between the first circuit (2) and the second circuit (3).

7. The improved apparatus (1) for conversion of thermal energy to kinetic energy as claimed in claim 6, characterized in that the apparatus further comprises:
   measurement sensors for one or more of temperature, flow rate, and pressure;
   a control unit for processing measurement data; and
   closed-loop controllers for controlling the process.

8. The improved apparatus (1) for conversion of thermal energy to kinetic energy as claimed in claim 6, characterized in that the environmental heat exchangers (4, 12) are incorporated into external circuits.

9. The improved apparatus (1) for conversion of thermal energy to kinetic energy as claimed in claim 6, characterized in that at least two of the first heat exchanger (6), the third heat exchanger (11), and the second environmental heat exchanger (12) are connected in a heat exchange arrangement.

10. The improved apparatus (1) for conversion of thermal energy to kinetic energy as claimed in claim 6, characterized in that the circuits (2, 3) have bypass conduits for bypassing the environmental heat exchangers (4, 12).

11. The method of converting thermal energy to kinetic energy as claimed in claim 1, characterized in that the apparatus comprises bypass conduits for bypassing the environmental heat exchangers (4, 12) to protect the apparatus from overheating in a controlled manner.

\* \* \* \* \*